（12) United States Patent
Oddsen, Jr. et al.

(10) Patent No.: US 7,673,838 B2
(45) Date of Patent: Mar. 9, 2010

(54) QUICK RELEASE ASSEMBLY FOR AN ELECTRONIC DEVICE

(75) Inventors: Odd N. Oddsen, Jr., Easton, PA (US); Bradley A. Derry, Allentown, PA (US)

(73) Assignee: Innovative Office Products, Inc., Easton, PA (US)

( * ) Notice: Subject to any disclaimer, the term of this patent is extended or adjusted under 35 U.S.C. 154(b) by 1118 days.

(21) Appl. No.: 11/058,820

(22) Filed: Feb. 16, 2005

(65) Prior Publication Data

US 2006/0181637 A1   Aug. 17, 2006

(51) Int. Cl.
E04G 3/00 (2006.01)
(52) U.S. Cl. ............... 248/278.1; 248/292.14; 248/225.11; 248/299.1; 248/222.52; 248/221.11; 248/222.11; 403/110
(58) Field of Classification Search ............. 248/278.1, 248/292.12, 222.51, 222.52, 292.1, 298.1, 248/299.1, 314, 279.1, 220.21, 292.14, 225.11, 248/291.1, 316.2, 917, 918, 919, 921; 361/681, 361/682, 683, 825; 403/83, 84, 86, 110
See application file for complete search history.

(56) References Cited

U.S. PATENT DOCUMENTS

| | | |
|---|---|---|
| 1,002,783 A | 9/1911 | Sweet |
| 2,584,921 A | 2/1952 | Rawnsley et al. |
| 3,348,116 A | 10/1967 | Freeman et al. |
| 3,820,752 A | 6/1974 | Oram |
| 3,874,309 A | 4/1975 | Cowley et al. |
| 4,082,244 A | 4/1978 | Groff |
| 4,166,602 A | 9/1979 | Nilsen et al. |
| 4,345,147 A | 8/1982 | Aaron et al. |
| 4,500,251 A | 2/1985 | Kiryu et al. |
| 4,545,555 A | 10/1985 | Koch |
| 4,547,027 A | 10/1985 | Scheibenreif |
| 4,589,713 A | 5/1986 | Pfuhl et al. |

(Continued)

FOREIGN PATENT DOCUMENTS

EP  0424074  4/1991

(Continued)

OTHER PUBLICATIONS

Office Action from corresponding Canadian Application 2,535,287, dated Sep. 15, 2008.

Primary Examiner—J. Allen Shriver
Assistant Examiner—Todd M. Epps
(74) Attorney, Agent, or Firm—Design IP

(57) ABSTRACT

A quick release assembly is provided to enable a user to easily attach and detach electronic equipment such as a flat panel monitor to an extension arm or other mounting device. One embodiment of the quick release assembly includes an adapter plate for connecting to the electronic equipment, a connecting plate for securing to the mounting device, and a release plate disposed between the adapter plate and the connecting plate. When fully assembled, the user can press a release mechanism on the release plate to disengage the release plate and the connecting plate from the adapter unit. After the release mechanism is pressed, the connecting plate can be slid off of the adapter plate. Unlike conventional devices, it is not necessary to remove or loosen hard to reach fasteners in order to disconnect the electronic device from the mounting device.

28 Claims, 14 Drawing Sheets

U.S. PATENT DOCUMENTS

| | | | |
|---|---|---|---|
| 4,726,552 A | 2/1988 | Warshawsky | |
| 4,834,329 A | 5/1989 | Delapp | |
| 4,836,486 A | 6/1989 | Vossoughi et al. | |
| 4,989,813 A | 2/1991 | Kim et al. | |
| 5,009,384 A | 4/1991 | Gerke et al. | |
| 5,123,621 A | 6/1992 | Gates | |
| 5,128,662 A | 7/1992 | Failla | |
| 5,144,290 A | 9/1992 | Honda et al. | |
| 5,168,429 A | 12/1992 | Hosoi et al. | |
| 5,193,069 A | 3/1993 | Furuya et al. | |
| 5,342,137 A | 8/1994 | Peng et al. | |
| 5,379,205 A | 1/1995 | Peng et al. | |
| 5,538,214 A | 7/1996 | Sinila | |
| 5,583,529 A | 12/1996 | Satou et al. | |
| 5,600,580 A | 2/1997 | Honjo et al. | |
| 5,687,939 A | 11/1997 | Moscovitch | |
| 5,751,548 A | 5/1998 | Hall et al. | |
| 5,768,163 A | 6/1998 | Smith, II | |
| 5,812,368 A | 9/1998 | Chen et al. | |
| 5,815,735 A | 9/1998 | Baker | |
| 5,820,287 A | 10/1998 | Bartlett et al. | |
| 5,842,672 A | 12/1998 | Sweere et al. | |
| 5,850,358 A | 12/1998 | Danielson et al. | |
| 5,854,735 A | 12/1998 | Cheng et al. | |
| 5,859,628 A | 1/1999 | Ross et al. | |
| 5,859,762 A | 1/1999 | Clark et al. | |
| 5,873,554 A | 2/1999 | Nobuchi et al. | |
| D412,162 S | 7/1999 | Tal et al. | |
| 5,947,429 A | 9/1999 | Sweere et al. | |
| D420,989 S | 2/2000 | Sandhu et al. | |
| 6,018,847 A | 2/2000 | Lu et al. | |
| 6,042,414 A | 3/2000 | Kunert | |
| 6,076,785 A | 6/2000 | Oddsen, Jr. | |
| 6,134,103 A | 10/2000 | Ghanma | |
| RE36,978 E | 12/2000 | Moscovitch et al. | |
| 6,173,933 B1 | 1/2001 | Whiteside et al. | |
| 6,189,842 B1 | 2/2001 | Bergeron Gull et al. | |
| 6,231,371 B1 | 5/2001 | Helot | |
| 6,246,577 B1 | 6/2001 | Han et al. | |
| 6,283,428 B1 | 9/2001 | Maples et al. | |
| 6,288,891 B1 | 9/2001 | Hasegawa et al. | |
| 6,290,534 B1 | 9/2001 | Sadler | |
| 6,343,006 B1 | 1/2002 | Moscovitch et al. | |
| 6,343,775 B1 | 2/2002 | Jones et al. | |
| 6,364,697 B1 | 4/2002 | Tseng et al. | |
| 6,366,453 B1 | 4/2002 | Wang et al. | |
| 6,366,458 B1 | 4/2002 | Yoshida et al. | |
| 6,378,829 B1 | 4/2002 | Strater et al. | |
| 6,400,560 B1 | 6/2002 | Chian et al. | |
| 6,409,134 B1* | 6/2002 | Oddsen, Jr. | 248/274.1 |
| 6,464,185 B1 | 10/2002 | Minelli et al. | |
| 6,478,274 B1* | 11/2002 | Oddsen, Jr. | 248/274.1 |
| 6,505,988 B1* | 1/2003 | Oddsen, Jr. | 403/110 |
| 6,554,238 B1 | 4/2003 | Hibberd et al. | |
| 6,561,469 B1 | 5/2003 | Masuda et al. | |
| 6,657,853 B2 | 12/2003 | Oba et al. | |
| 6,695,270 B1 | 2/2004 | Smed | |
| 6,695,274 B1 | 2/2004 | Chiu et al. | |
| 6,698,063 B2 | 3/2004 | Kim et al. | |
| 6,702,604 B1 | 3/2004 | Moscovitch et al. | |
| 6,705,773 B2 | 3/2004 | Fix | |
| 6,758,454 B2* | 7/2004 | Smed | 248/314 |
| 6,808,406 B2 | 10/2004 | Lee et al. | |
| 6,874,744 B2 | 4/2005 | Rawlings et al. | |
| 6,935,883 B2 | 8/2005 | Oddsen, Jr. | |
| 6,963,487 B2 | 11/2005 | Billington et al. | |
| 6,967,668 B2 | 11/2005 | Byoun et al. | |
| 7,059,897 B2 | 6/2006 | Smith et al. | |
| 7,159,053 B1 | 1/2007 | Lakin | |
| 7,175,152 B2 | 2/2007 | Dittmer | |
| 7,232,098 B2 | 6/2007 | Rawlings et al. | |
| 7,317,613 B2* | 1/2008 | Quijano et al. | 361/679.41 |
| 7,338,019 B2 | 3/2008 | Liu et al. | |
| 7,390,211 B2 | 6/2008 | Moscovitch et al. | |
| 7,404,535 B2* | 7/2008 | Mossman et al. | 248/323 |
| 2001/0014637 A1 | 8/2001 | Miyaji | |
| 2001/0045497 A1 | 11/2001 | Coonan et al. | |
| 2002/0011544 A1* | 1/2002 | Bosson | 248/121 |
| 2002/0063046 A1* | 5/2002 | Shibata et al. | 200/5 R |
| 2002/0068985 A1 | 6/2002 | Oba et al. | |
| 2003/0083168 A1 | 5/2003 | Cipollone | |
| 2003/0162510 A1 | 8/2003 | Kim | |
| 2004/0031894 A1 | 2/2004 | Smed | |
| 2005/0085123 A1 | 4/2005 | Moscovitch | |
| 2005/0127260 A1 | 6/2005 | Dittmer | |
| 2006/0057887 A1 | 3/2006 | Lin | |

FOREIGN PATENT DOCUMENTS

| | | |
|---|---|---|
| JP | 10171382 | 6/1998 |
| WO | 9939328 | 8/1999 |
| WO | 9950813 | 10/1999 |
| WO | 0039493 | 7/2000 |

* cited by examiner

FIG. 4D
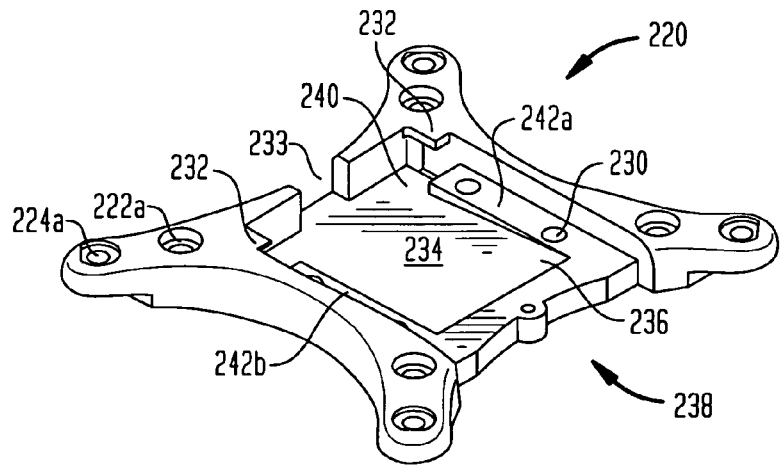
FIG. 4E
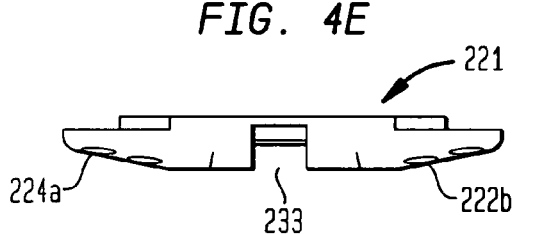
FIG. 4F
FIG. 4G
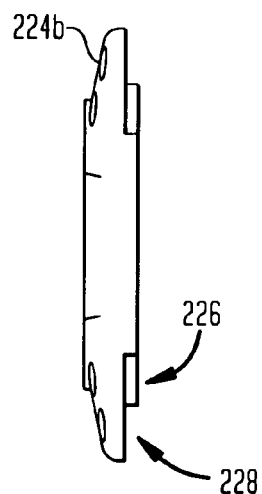
FIG. 4H
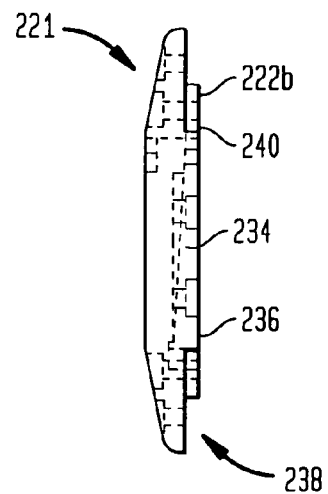

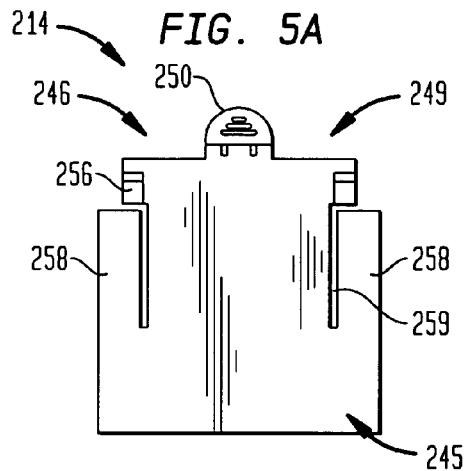
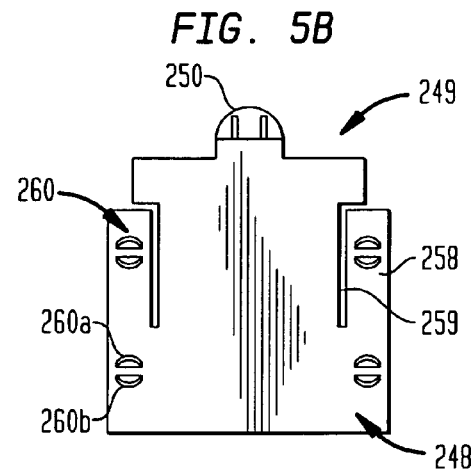
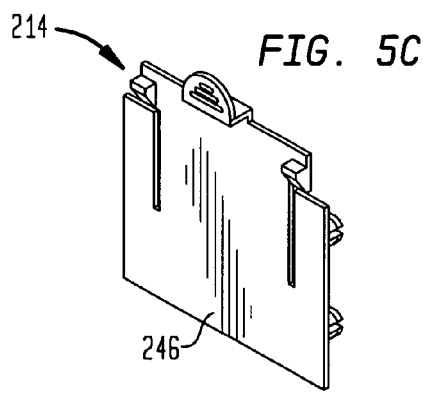
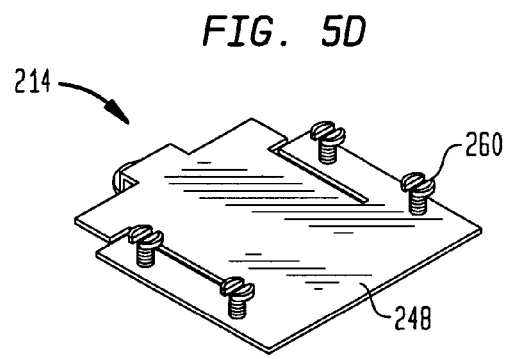
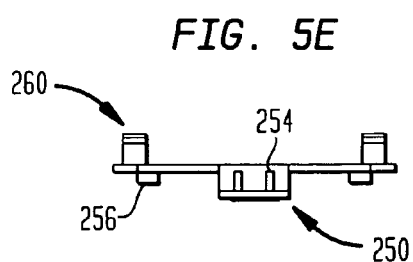
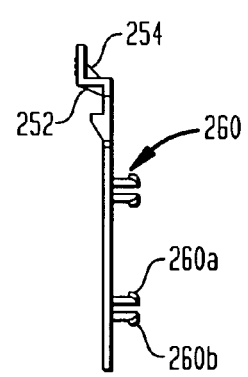

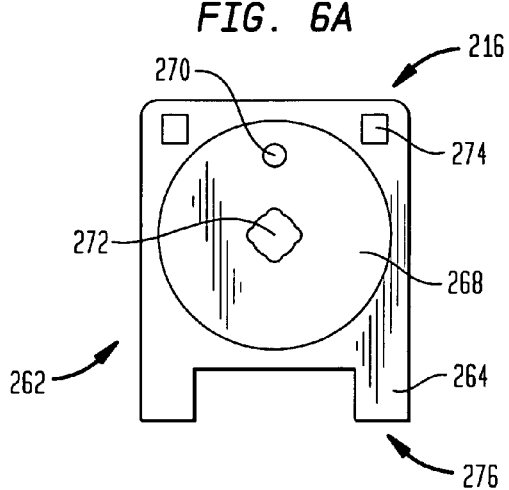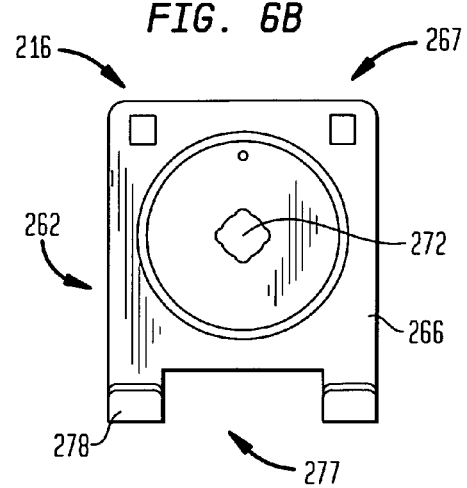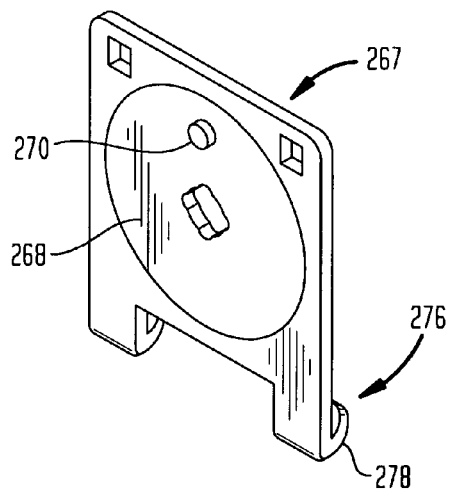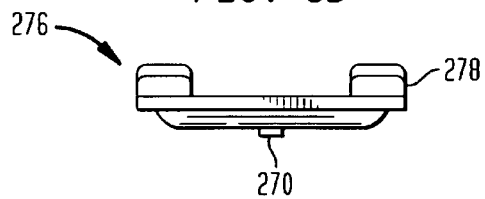

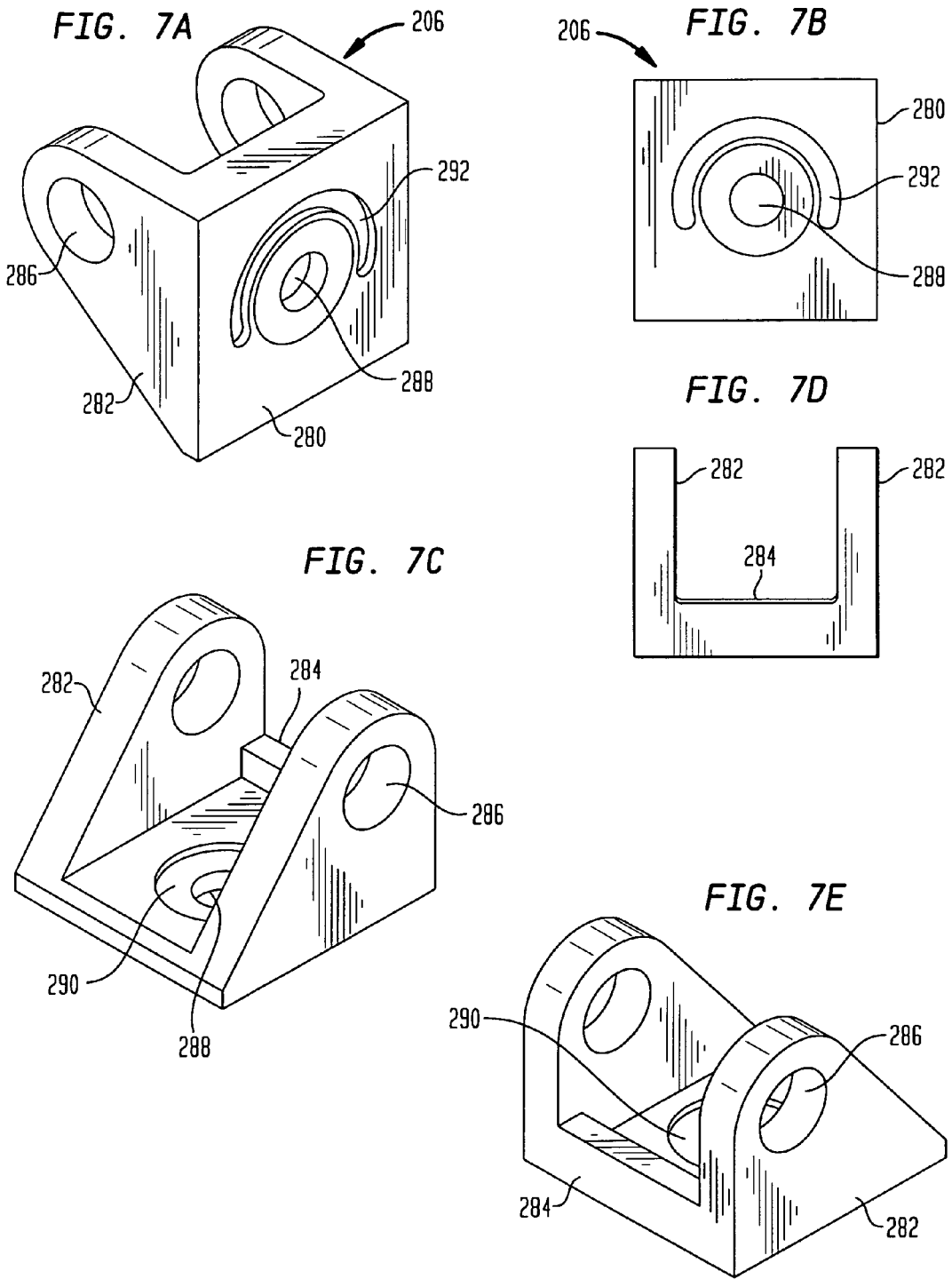

QUICK RELEASE ASSEMBLY FOR AN ELECTRONIC DEVICE

BACKGROUND OF THE INVENTION

The present invention relates to a device for use in connecting electronic devices. More particularly, the present invention relates to a quick release assembly that enables a user to attach and detach an electronic device such as a flat panel display from a mounting apparatus.

In the past people have placed video monitors and other electronic equipment on desks, tabletops, or upon other equipment such as personal computers or workstations. One drawback to these configurations is the reduction in available workspace taken up by the equipment. Another drawback is the inability to place the equipment in a desired location. A further drawback is the potential for eye strain, neck strain and/or a cumulative trauma disorder such as carpel tunnel syndrome from poor placement of devices such as monitors and keyboards.

Different solutions have been provided in order to overcome these obstacles. For example, in one solution, a monitor stand or printer stand elevates the apparatus over other equipment on a desk. While this may free up workspace, it often places the equipment in an undesirable location. Another solution employs a mechanical extension arm to support the monitor. Extension arms free up workspace and allow users to place the equipment where it is wanted. One such extension arm is shown and described in U.S. Pat. No. 6,478,274, entitled "Arm Apparatus for Mounting Electronic Devices," which is fully incorporated by reference herein. Another type of extension arm is shown and described in U.S. Pat. No. 6,409,134, entitled "Arm Apparatus For Mounting Electronic Devices With Cable Management System," which is fully incorporated by reference herein.

It is often desirable to obtain additional freedom of movement beyond that provided by the extension arm. A tilting device can be used to accomplish this goal. The tilting device is placed between the extension arm and the equipment, allowing the equipment to rotate about one or more axes. One such tilting device is shown and described in U.S. Pat. No. 6,505,988, entitled "Tilter for Positioning Electronic Devices," which is fully incorporated by reference herein.

While such tilter devices are very useful for positioning the equipment in a desired position, it may be difficult to rapidly detach the equipment from the tilting device and extension arm assembly. For example, a monitor may be secured to the tilting device by multiple screws. It might take several minutes to disassemble all of the screws, detach the monitor, and then attach a new monitor. In many businesses, such as brokerage firms and other investment concerns, users require ongoing access to a working display unit. Disruptions, even those as short as a few minutes, can seriously impacting users' abilities to perform their jobs. Thus, a quick release mechanism is needed to rapidly swap out a broken monitor for a working monitor. Furthermore, in order to detach the monitor without dropping it, the user needs to be very careful when removing the screws from a conventional tilting device so that the monitor does not suddenly detach and fall to the floor. It may be difficult to the access the screws, as there may not be much clearance between the monitor and the tilting device.

Therefore, a need exists for a quick release mechanism to address these and other concerns.

SUMMARY OF THE INVENTION

In accordance with an embodiment of the present invention, an adapter unit for releasably coupling a device to a mounting unit is provided. the adapter unit comprises an adapter plate having means for connecting to the device, a connecting plate having means for connecting to the mounting unit and means for coupling to the adapter plate, and a release plate disposed between the adapter plate and the connecting plate. The release plate includes a release mechanism for decoupling the connecting plate from the adapter plate.

In one alternative, the connecting plate comprises a rotating plate for rotating the device about an axis. In this case, the rotating plate is preferably rotatable about the axis through at least 180 degrees. In another alternative, the release mechanism comprises a post disposed about a first end of the release plate. In a further alternative, the release plate includes at least one connector and the adapter plate includes at least one receptacle adapted to secure the at least one connector thereto. In yet another alternative, the release plate includes at least one boss on a first side thereof, and the connecting plate includes at least one receptacle adapted to receive the at least one boss. In another alternative, the means for coupling the connecting plate to the adapter plate includes a connector having a pair of angled members adapted to engage a first end of the adapter plate. In a further alternative, the connecting plate comprises a rotating plate having a protrusion on a first side thereof. The protrusion is receivable by a channel in a tilter mount of the mounting unit. In this case, the rotating plate is at least partly rotatable along the channel of the tilter mount.

In accordance with another embodiment of the present invention, an adapter unit for releasably coupling an electronic device to a tilting device is provided. The adapter unit comprises an adapter plate, a rotating plate and a release plate. The adapter plate has a set of through-holes arranged therein, and is securable to the electronic device by receiving fasteners through the set of through-holes. The rotating plate is fastened to the tilting device, and includes a pair of angled members for securing the rotating plate to the adapter plate. The release plate is sandwiched between the adapter plate and the rotating plate. The release plate includes a post disposed adjacent to a first end thereof for decoupling the rotating plate from the adapter plate.

In an alternative, a first side of the adapter plate remote from the secured electronic device includes an angled surface tapering from a first thickness at a first end thereof to a second thickness at a second end thereof. In this case, the first side of the adapter plate preferably further includes a pair of planar surfaces disposed on either side of the angled surface, the pair of planar surfaces including means for releasably securing the release plate thereto.

In another alternative, the set of through-holes comprises a first set arranged with a first distance between adjacent through-holes thereof and a second set arranged with a second distance between adjacent through-holes thereof. In this case, the second distance is greater than the first distance. Preferably, the first distance is on the order of 75 millimeters and the second distance is on the order of 100 millimeters. Optionally, a first side of the adapter plate includes a pair of stepped surfaces. In this case, the first set of through-holes is arranged on a first one of the stepped surfaces and the second set of through-holes being arranged on a second one of the stepped surfaces.

In yet another alternative, the adapter plate includes an opening along a first side thereof to receive the post of the release plate. In a further alternative, the rotating plate includes a first side having a raised portion with a protrusion thereon. In this case, the protrusion is receivable by a channel in a tilter mount of the tilting device.

In accordance with a further embodiment of the present invention, an adapter system for releasably coupling an electronic device to a mounting unit is provided. The adapter system comprises a tilting device and an adapter unit. The tilting device includes a tilter head having means for securing to the mounting unit, a tilter mount, and a tilter bar for rotatably coupling the tilter mount to the tilter head. The adapter unit includes an adapter plate having means for connecting to the device, a connecting plate securable to the tilter mount and having means for coupling to the adapter plate, and a release plate disposed between the adapter plate and the connecting plate, the release plate including a release mechanism for decoupling the connecting plate from the adapter plate.

In an alternative, the tilter mount includes a pair of flanges coupled to the tilter bar and a stop on a first side of the tilter mount for arresting the rotation of the tilter mount along an axis. In this case, the stop preferably comprises a pair of blocks disposed on either end of the first side adjacent to the pair of flanges.

In another alternative, the adapter system further comprises a washer. In this case, the tilter mount further includes a washer channel for receiving the washer. The washer channel is disposed on a second side of the tilter mount. The connecting plate comprises a rotating plate having a protrusion on a first side thereof. The protrusion is in communication with the washer in the washer channel so that the rotating plate is rotatable about an axis of the tilter mount.

In accordance with yet another embodiment of the present invention, a method of configuring an adapter unit is provided. The adapter unit is operable to releasably couple an electronic device to a mounting apparatus. The method comprises coupling a release plate to an adapter plate so that a first side of the release plate contacts a first side of the adapter plate; and coupling a connecting plate to the release plate and to the adapter plate so that a first side of the release plate contacts a second side of the release plate, the release plate being disposed between the adapter plate and the connecting plate; wherein actuation of the release plate causes the connecting plate to at least partly decouple from the adapter plate.

In an alternative, coupling the connector plate includes sliding the connecting plate into contact with the adapter plate so that a pair of angled members of the connector plate are in operative contact with the adapter plate. In another alternative, the method further comprises fastening the electronic device to a second side of the adapter plate. In yet another alternative, the method further comprises securing the connecting plate to the mounting apparatus. In this case, securing the connecting plate preferably includes riveting the connecting plate to a tilter mount of the mounting apparatus. In a further alternative, the method further comprises pressing a release mechanism on the release plate to at least partly decouple the connecting plate from the adapter plate. In this case, the method desirably further comprises slidably disengaging the connecting plate from the adapter plate.

In accordance with another embodiment of the present invention, an adapter unit for releaseably coupling a device to a mounting unit is provided. The adapter unit comprises an adapter plate, a connecting plate, and a release plate. The adapter plate has means for connecting to the device. The connecting plate has means for connecting to the mounting unit and means for coupling to the adapter plate. The release plate is disposed between the adapter plate and the connecting plate. The release plate includes means for decoupling the connecting plate from the adapter plate.

In an alternative, the adapter unit further comprises a security mechanism operable to prevent unauthorized or accidental detachment of the adapter plate from the connecting plate. In this case, the security mechanism preferably comprises a threaded fastener receivable by a through-hole in the adapter plate. In another alternative, the adapter plate further comprises means for retaining the connecting plate. In this case, the retaining means preferably comprises at least one tab disposed on a first surface of the adapter plate. Here, the connecting plate is retained between the tab and a second surface of the adapter plate.

BRIEF DESCRIPTION OF THE DRAWINGS

FIGS. 4(a)-(h) illustrate an adapter plate in accordance with aspects of the present invention.

FIGS. 5(a)-(f) illustrate a release plate in accordance with aspects of the present invention.

FIGS. 6(a)-(f) illustrate a connecting/rotating plate in accordance with aspects of the present invention.

FIGS. 7(a)-(g) illustrate a tilter mount in accordance with aspects of the present invention.

DETAILED DESCRIPTION

The aspects, features and advantages of the present invention will be appreciated when considered with reference to the following description of preferred embodiments and accompanying figures. In describing the preferred embodiments of the invention illustrated in the figures, specific terminology will be used for the sake of clarity. However, the invention is not intended to be limited to the specific terms so selected, and it is to be understood that each term selected includes all technical equivalents that operate in a similar manner to accomplish a similar purpose.

Figure 1:
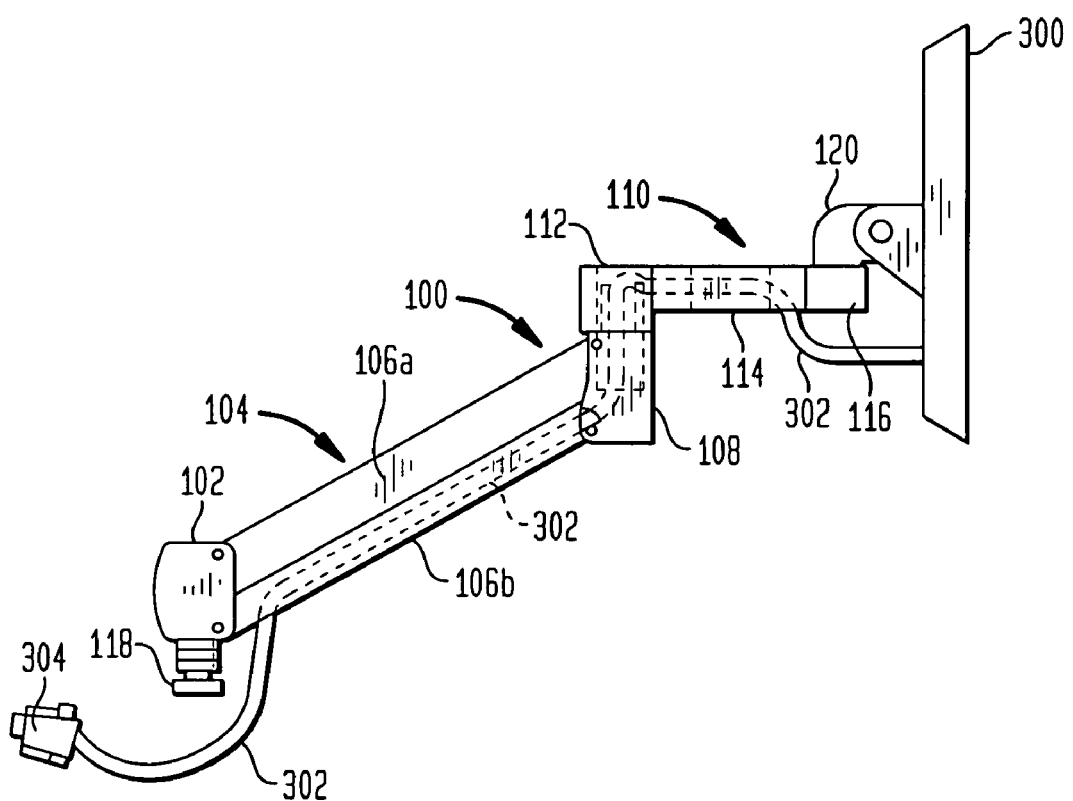
FIG. 1 illustrates an extension arm assembly connected to a tilting device for adjustably mounting an electronic device.

FIG. 1 illustrates an extension arm 100 that can be connected at one end to a mounting assembly (not shown) and attached to a tilting device 200 at the other end. The mounting assembly may be of any desired configuration, and may be affixed to a piece of furniture such as a desk, a wall such as a slat wall, a section of an office cubicle, etc. The tilting device 200 can be connected to an electronic device 300 such as a flat panel monitor. A cable 302 is connected to the electronic device 300 at one end, and has a plug or other connector 304 at the other end. While the electronic device 300 is described below as a flat panel monitor or other video monitor, the invention is not limited to use with such devices, and may be used with a wide variety of equipment, including non-powered equipment.

The extension arm 100 may be a conventional extension arm or any other suitable mounting device. Preferably, the extension arm 100 is one of the types fully described in above-referenced U.S. Pat. Nos. 6,409,134 and 6,478,274. As shown in FIG. 1, the extension arm 100 may include a first endcap 102, an arm 104, a second endcap 108 and a forearm extension 110.

The first endcap 102 includes a housing attached to one end of the arm 104 by, for example, pins. A shaft 118 or other connection device is adapted for connection to the mounting assembly. The shaft 118 may be integrally molded with an endwall of the housing of the first endcap 102. Alternatively, the shaft 118 may be securely attached to the housing of the first endcap 102. The shaft 118 is preferably integral with the first endcap 102.

The arm 104 is preferably formed of an upper housing 106a and a lower housing 106b. The upper housing 106a and the lower housing 106b define a chamber therebetween containing, for example, a gas spring (not shown). The gas spring is preferably adjustably mounted at one end within the first endcap 102 and at the other end to, for example, a ball stud mounted within the upper housing 106a. The cable 302 may be secured within the arm 104 as shown and described in U.S. Pat. No. 6,409,134. Alternatively, the arm 104 may include one or more external cable ties in order to secure the cable 302 of the electronic device 300 supported by the extension arm 100.

The second endcap 108 has a housing attached to the second end of the arm 104 by, for example, pins. A shaft may extend out of the top of the housing of the second endcap 108 and optionally connect to the forearm extension 110. The forearm extension 110 includes a body 114 having an interior channel, as well as a first end 112 and a second end 116. The forearm extension 110 is preferably rotatable about an axis of the first end 112.

The upper housing 106a, the lower housing 106b, the first endcap 102 and the second endcap 108 are configured so as to form an adjustable parallelogram. When configured, the housing of the first endcap 102 and the housing of the second endcap 108 point in opposite directions. The shape of the parallelogram is retained by the gas spring within the chamber of the arm 104. Generally, the gas spring is sized so as to have a fixed length until an upward or downward force is exerted at the second endcap 108 that exceeds the gas spring's designed resistance. Thus, the gas spring retains the parallelogram shape when the only force exerted at the second endcap 108 is the weight of the electronic device 300. However, the gas spring permits the parallelogram shape to be adjusted when a user pushes the electronic device 300, which is preferably coupled to the forearm extension 110 by means of the tilting device 200, up or down.

Figure 2:
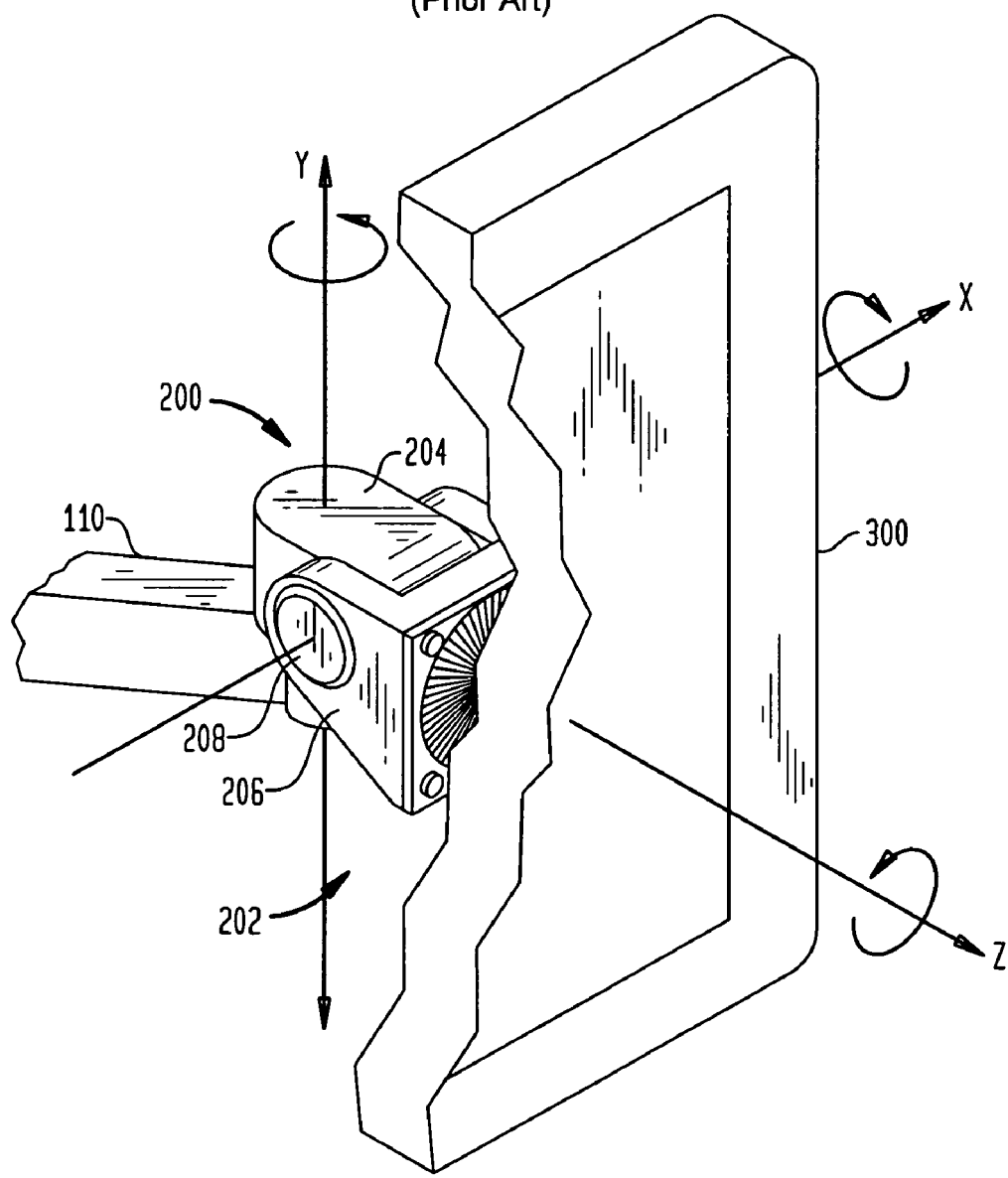
FIG. 2 illustrates an enlarged view of a portion of FIG. 1.

The tilting device 200 can be directly connected to the endcap 108 or to the second end 116 of the forearm extension 110, and is preferably rotatable thereabout. Different tilting devices 200 can be used to tilt, angle, pivot and/or rotate the electronic device 300 in accordance with aspects of the present invention. By way of example only, as seen in FIG. 2, the tilting device 200 may enable the electronic device 300 to rotate or pivot about two axes, namely the X-axis and the Y-axis. An adapter unit 202 connected to the tilting device 200 may rotate or pivot about the Z-axis. The forearm extension 110 preferably has a locking mechanism for restricting movement of the tilting device 200 about the Y-axis. The tilting device 200 may also include a locking mechanism for restricting movement about the X-axis. The locking mechanisms may comprise, for example, a set screw insertable into either a wall of the second end 116 or into a portion of the tilting device 200.

The tilting device 200 may comprise known components, such as those shown and described in aforementioned U.S. Pat. No. 6,505,988. As seen in FIG. 2, an embodiment of the tilting device 200 for use in accordance with the present invention includes a tilter head 204, a tilter mount 206, and a tilter bar 208 coupling the tilter mount 206 to the tilter head 204. The adapter unit 202 couples the electronic device 300 to the tilting device 200.

Figure 3A:
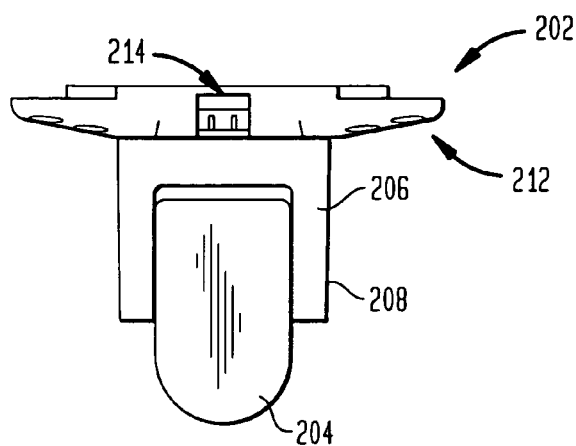
FIGS. 3(a)-(c) illustrate a tilting device and an adapter unit in accordance with aspects of the present invention.
Figure 3B:
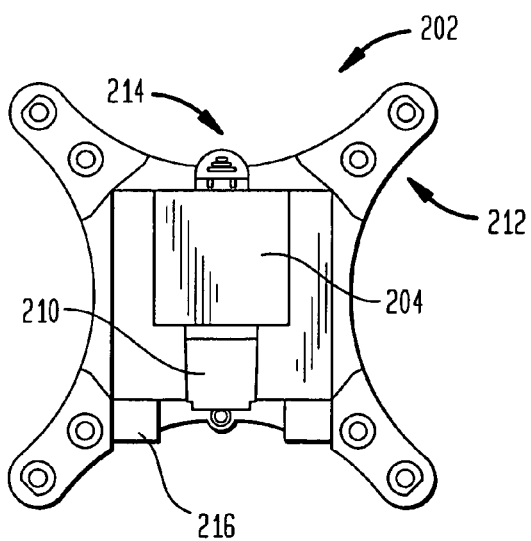
Figure 3C:
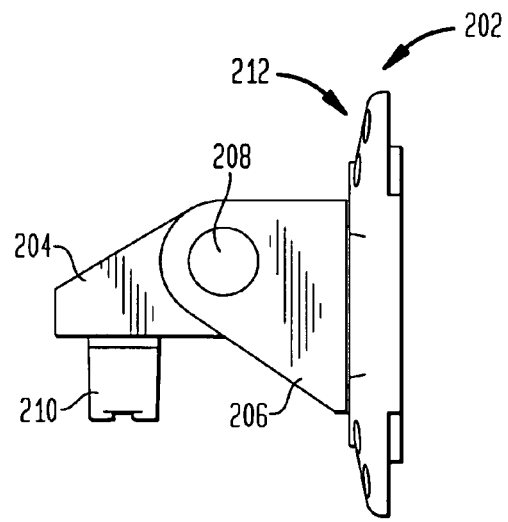

Examples of the tilting device 200 and the adapter unit 202 are shown in more detail in FIGS. 3(a)-(c). As seen in the rear and side views of FIGS. 3(b) and 3(c), the tilter head 204 preferably includes a base or stem 210 for insertion into the second end 116 of the forearm extension 110 or into the endcap 108.

In accordance with aspects of the present invention, the adapter unit 202 is desirably a quick release adapter unit 202. The quick release adapter unit 202 preferably comprises an adapter plate 212, a release plate 214 and a connecting or rotating plate 216. The electronic device 300 mounts to the adapter plate 212. The connecting/rotating plate 216 mounts to the tilting device 200 and preferably enables the electronic device 300, as well as the adapter plate 212 and the release plate 214, to rotate about the Z-axis. The release plate 214 enables a user to quickly separate the adapter plate 212 and the electronic device 300 from the rotating plate 216 and the tilting device 200. The adapter plate 212, the release plate 214 and the rotating plate 216 will be described in more detail below.

Figure 4A:
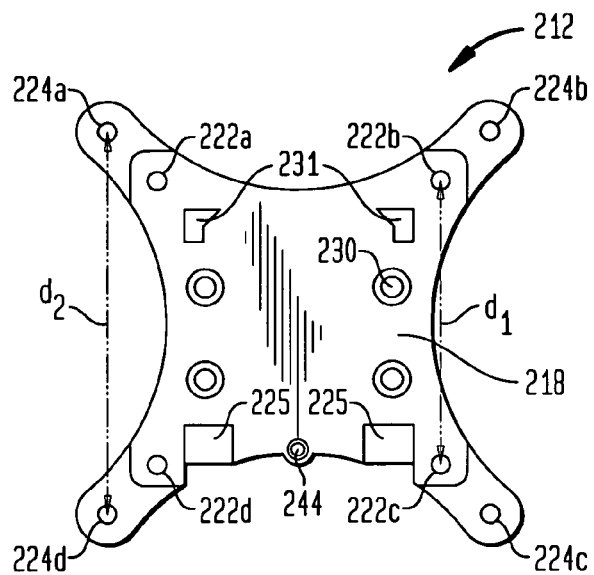
Figure 4B:
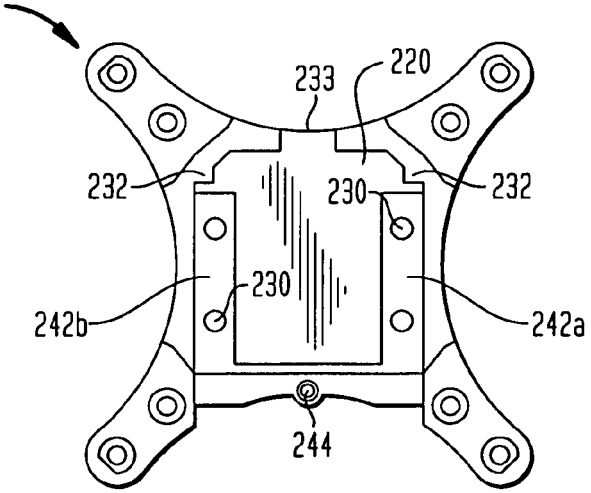
Figure 4C:
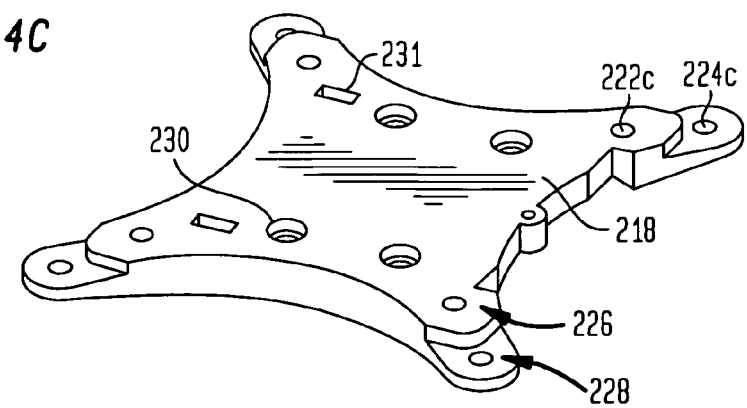

FIGS. 4(a)-(h) illustrate views of the preferred embodiment of the adapter plate 212. In particular, FIG. 4(a) illustrates a front side 218, FIG. 4(b) illustrates a rear side 220, FIG. 4(c) illustrates a perspective view of the front side 218, and FIG. 4(d) illustrates a perspective view of the rear side 220. FIGS. 4(e)-(f) illustrate views of a first end 221 of the adapter plate 212. FIGS. 4(g)-(h) illustrates side views of the adapter plate 212. As seen in the front and rear views of FIGS. 4(a)-(b), the side edges of the adapter plate 212 may have a curved or star configuration. Alternatively, the side edges may have any other geometric shape. The adapter plate 212 preferably comprises a metal such as aluminum, and may be cast as a single unit. However, the adapter plate 212 may be formed using plastic or other materials. Alternatively, the adapter plate 212 could be fabricated from two or more components.

As seen in FIGS. 4(a)-(b), the adapter plate 212 preferably includes a first set of through-holes 222a-d and a second set of through-holes 224a-d. The sets of through-holes 222a-d and 224a-d desirably conform to Video Electronics Standards Association (VESA) standards for hole patterns found on conventional computer monitors. For example, the first set of through-holes 222a-d are preferably formed in a square configuration with a distance $d_1$ of approximately 75 mm or approximately 2.95 inches between adjacent through-holes 222a-d. Similarly, the second set of through-holes 224a-d are preferably also formed in a square configuration with a distance $d_2$ of approximately 100 mm or approximately 3.94 inches between adjacent through-holes 224a-d. The adapter plate 212 is secured to the electronic device 300 by screws or other fasteners (not shown), which are insertable through the through-holes 222a-f and 224a-d and into receptacles in the electronic device 300. As seen in FIG. 4(a), the front side 218 may include one or more receptacles or regions 225 to assist in securing the connecting/rotating plate 216, as will be described below.

As seen in the perspective view of FIG. 4(c), the front side 218 may include stepped surfaces 226 and 228, wherein the through-holes 222a-d are positioned on the surface 226 and the through-holes 224a-d are positioned on the surface 228. As seen in the perspective view of FIG. 4(d), the through-holes 222a-d and 224a-d may be countersunk on the rear side 220.

The adapter plate 212 preferably includes one or more attachment points to connect to the release plate 214. For example, the adapter plate 212 may include a series of receptacles or through-holes 230 and/or slots 231. The through-holes 230 may be countersunk on the front side 218. The slots 231 are preferably provided to enable fabrication (e.g., casting) of one or more tabs 232, which may be located on the rear side 220. See FIGS. 4(b) and 4(d). As seen in FIGS. 4(d)-(f), the adapter plate 212 may also include an opening or recess 233 at or near the top of the adapter plate 212.

As seen in FIGS. 4(d) and 4(h), the rear side 220 preferably includes a surface 234, which may be angled so that it tapers from a larger thickness 236 near a second end 238 to a narrower thickness 240 near the first end 221. The rear side 220 may also include a pair of surfaces 242a,b, that may be integral with or separate from the surface 234. The surfaces 242a,b are preferably substantially planar. Referring back to FIGS. 4(a)-(b), the second end 238 may also include a receptacle or through-hole 244.

FIGS. 5(a)-(f) illustrate views of the release plate 214. The release plate 214 has a main body 245 with a front side 246 and a rear side 248. In particular, FIG. 5(a) illustrates a front side 246, FIG. 5(b) illustrates a rear side 248, FIG. 5(c) illustrates a perspective view of the front side 246, and FIG. 5(d) illustrates a perspective view of the rear side 248. FIG. 5(e) illustrates a view of a first end 249 of the release plate 214. FIG. 5(f) illustrates a side view of the release plate 214. The release plate 214 is preferably formed of a plastic such as DELRIN® brand acetal resin from E.I. Du Pont De Nemours and Company Corporation, and may be cast as a single unit. However, the release plate 214 may be formed using a metal, such as spring steel, or other materials. Alternatively, the release plate 214 could be fabricated from two or more components.

The front side 246 of the release plate 214 preferably includes a post 250 disposed at or proximate to the first end 249. The post 250 may be reinforced by supports 252 and/or supports 254. In place of the post 250, any other device or mechanism that can function as a release mechanism may be employed. By way of example only, a recess or depression can be used. The front side 246 preferably also includes one or more bosses 256 or other projections, and may also include a pair of arms 258 extending substantially parallel to one another, as seen in FIG. 5(a). The arms 258 may be partially separated from the main body 245 of the release plate 214 by slits or gaps 259.

The rear side 248 of the release plate 214 preferably includes one or more connectors 260 that are adapted to engage the receptacles or through-holes 230. As seen in the side view of FIG. 5(f), the connectors 260 may each comprise first and second halves 260a,b, which may be partially or fully separate from one another. The halves 260a,b are preferably flexible, so that they may bend towards one another during insertion into the receptacle/through-hole 230, and then may return to non-bent positions for securing the release plate 214 to the adapter plate 212. Desirably, the connectors 260 are chosen so that the release plate 214 is securely or permanently affixed to the adapter plate 212.

Figure 6E:
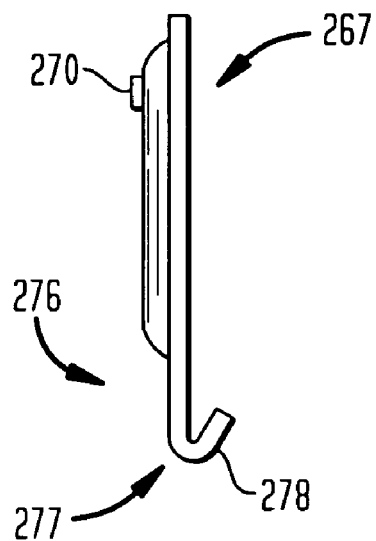
Figure 6F:
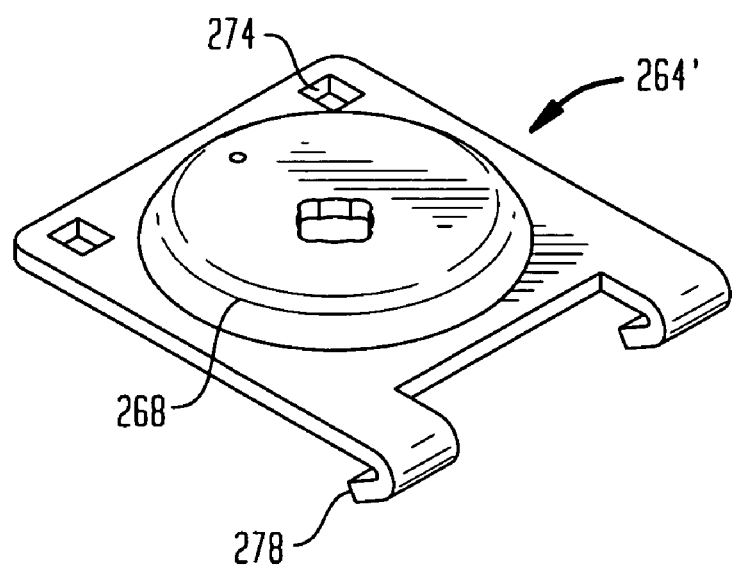

FIGS. 6(a)-(f) illustrate views of the connecting or rotating plate 216. The rotating plate 216 has a main body 262 with a front side 264 and a rear side 266. In particular, FIG. 6(a) illustrates the front side 264 and FIG. 6(b) illustrates the rear side 266. FIG. 6(c) illustrates a perspective view of the front side 264. FIG. 6(d) illustrates a first end 267 of the rotating plate 216. FIG. 6(e) illustrates a side view of the rotating plate 216. FIG. 6(f) illustrates a perspective view of an alternate front side 264'. The rotating plate 216 preferably comprises a metal such as aluminum, and may be cast as a single unit. However, the rotating plate 216 may be formed using plastic or other materials. Alternatively, the rotating plate 216 could be fabricated from two or more components.

As seen in FIGS. 6(a), (c), the front side 264 preferably includes a raised portion 268. The raised portion 268 desirably has a protrusion 270 thereon, as well as a central opening 272 therein. The central opening 272 may be circular, or may have some other shape. In a preferred embodiment best seen in FIGS. 6(a)-(b), the central opening 272 has a "flower" or dimpled shape to help hold a rivet. The main body 262 preferably also includes at least one receptacle or opening 274 near the first end 267, as well as one or more connectors 276 near a second end 277. As seen in FIGS. 6(b)-(e), the connector(s) 276 preferably includes a securing means such as a hook or angled member 278. The receptacle(s) 274 and the angled member(s) 278 are used to secure the rotating plate 216 to the adapter plate 212 and the release plate 214, as will be explained below. While the rotating plate 216 preferably includes the protrusion 270, in an alternative embodiment shown in FIG. 6(f), the protrusion 270 may be omitted from the front side 264'.

FIGS. 7(a)-(e) illustrate a preferred embodiment of the tilter mount 206. The tilter mount 206 is desirably formed from relatively lightweight, strong metal, such as aluminum. More preferably, the tilter mount 206 is cast as a single unitary structure. As shown in FIG. 7(a), the tilter mount 206 desirably comprises a base 280 having a generally square shape, from which extends a pair of flanges 282. A stop 284, which is preferably a rectangular shaped block, is desirably formed on an inner surface of the base 230 adjacent to and connecting the flanges 282. See FIGS. 7(c), 7(e). The stop 284 serves to arrest the rotation of the tilter mount 206 in the negative or downward direction about the X-axis of the tilter head 204. As illustrated in FIGS. 7(a), (c), and (e), the flanges 282 desirably include shaft holes 286 formed therein for accepting the tilter bar 208 and other components of the tilting device 200. The shaft holes 286 preferably align with a central opening of the tilter head 204 so as to form an extended tubular passageway. A rivet hole 288 desirably extends through the center of the base 280. The rivet hole 288 preferably includes a recessed portion 290 upon which a head of a rivet may securely fit.

FIGS. 7(a), (b) illustrate that the base 280 also preferably includes a washer channel 292 that is adapted to receive a washer. The washer channel 292 is desirably shallow, for example having a depth on the order of 0.25 inches or less. The washer channel 292 may partly or completely encircle the rivet hole 288. As best seen in FIG. 7(b), the washer channel 292 in the present embodiment encircles at least ½ of the rivet hole 288 about the Z-axis, for example on the order of 95° to the left or to the right relative to the Y-axis.

Figure 7F:
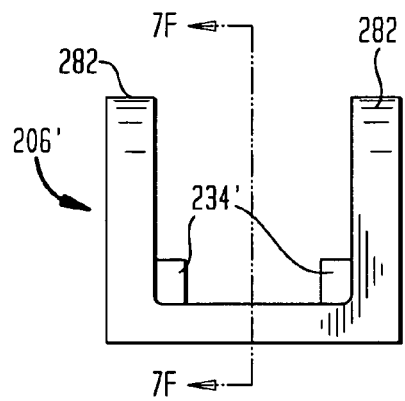
Figure 7G:
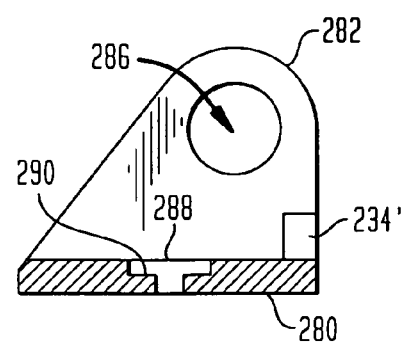

An alternative tilter mount 206' is illustrated in FIGS. 7(f)-(g). Here, the stop 284 preferably comprises at least two blocks 284'. The blocks 284 are desirably rectangular in shape, and are preferably directly connected to the flanges 282. FIG. 7(g) illustrates a cutaway view of the tilter mount 206 along the 7F-7F line, showing the rivet hole 288 and the recessed portion 290 thereof.

Figure 8:
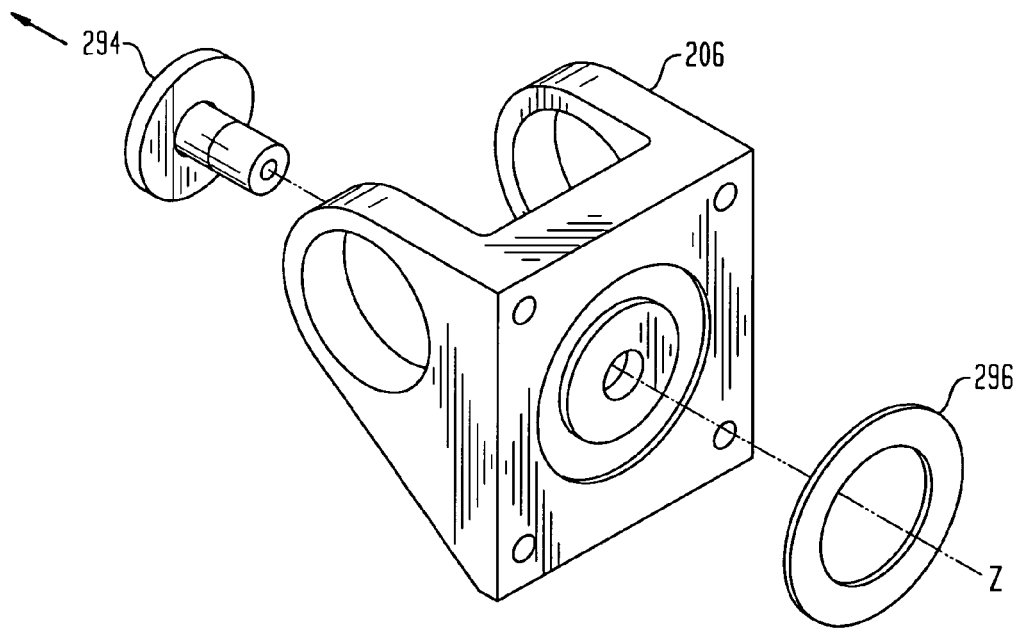
FIG. 8 illustrates an exploded view of a tilter mount, a rivet and a washer in accordance with aspects of the present invention.

FIG. 8 illustrates an alternative tilter mount 206', and shows how a rivet 294 and a washer 296 attach thereto. The rivet 294 preferably is made of metal. The washer 296 preferably comprises nylon, and should be no thicker then the depth of the washer channel 292. The rivet 294 is at least partly insertable through the rivet hole 288. The washer 296 is inserted into the washer channel 292. As seen in this figure, the washer channel 292 and the washer 296 may both be completely circular.

Figure 9A:
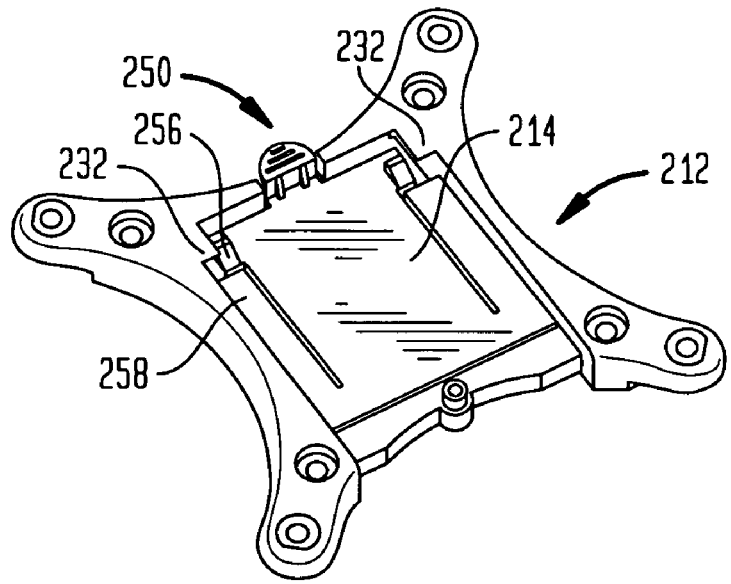
FIGS. 9(a)-(f) illustrate assembling an adapter unit in accordance with aspects of the present invention.

Assembly of the quick release adapter unit 202 in accordance with aspects of the present invention will now be described with regard to FIGS. 9(a)-(f). As seen in FIG. 9(a), the release plate 214 couples to the surface 234 of the rear side 220 of the adapter plate 212. The connectors 260 on the rear side 248 of the release plate 214 engage the receptacles 230 in the adapter plate 212, and the bosses 256 protrude away from the rear side 248. In an alternative embodiment, the rear side 248 of the release plate 214 may include receptacles and the adapter plate 212 may include connectors to attach thereto. In fact, any type of fastening means is possible between the release plate 214 and the adapter plate 212. As mentioned above, the release plate 214 may be permanently affixed to the adapter plate 212. The post 250 on the release plate 214 is preferably at least partly received in the opening 233 of the adapter plate 212. The pair of arms 258 preferably contact the pair of flat surfaces 242a,b. At this point, the main body 245 and the arms 258 preferably lie along the same plane.

Figure 9B:
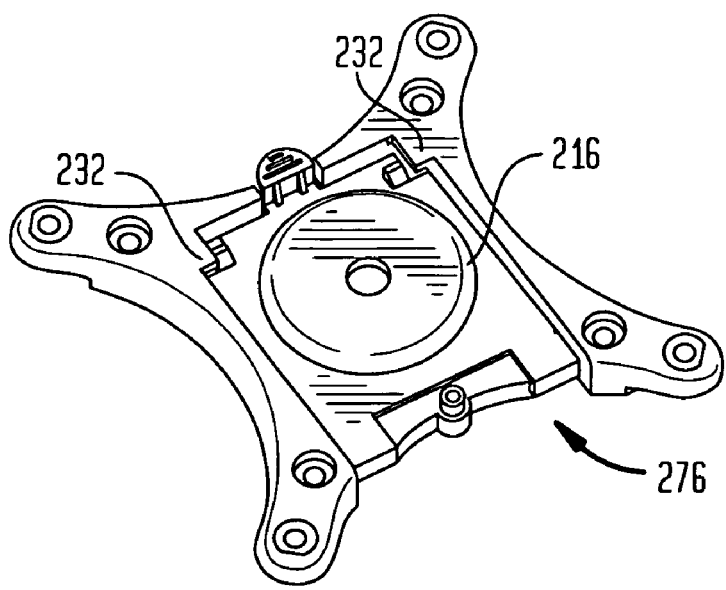
Figure 9C:
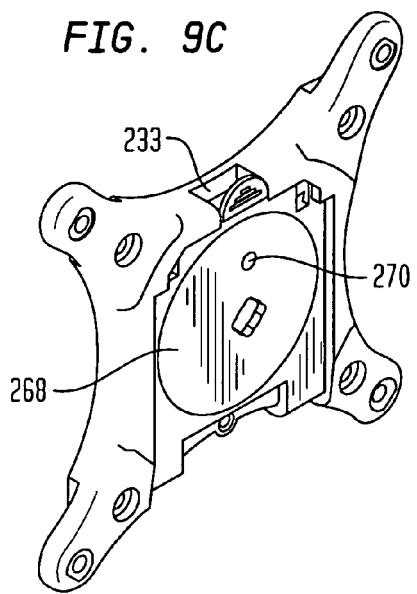
Figure 9D:
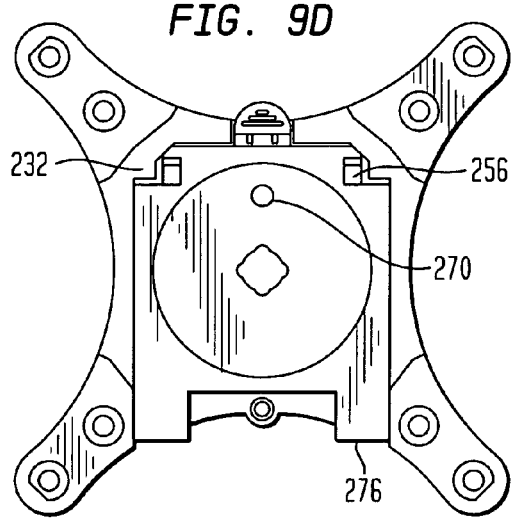
Figure 9E:
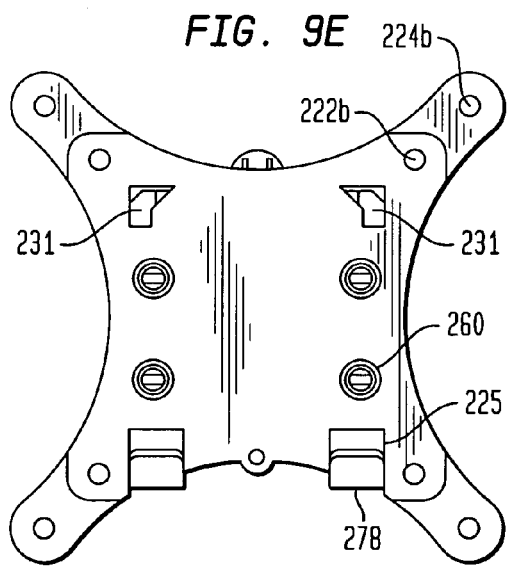
Figure 9F:
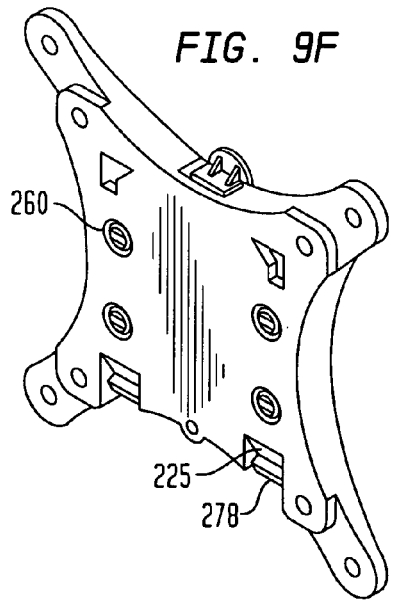

FIG. 9(b) illustrates the rotating plate 216 after it is coupled to the adapter plate 212 and the release plate 214. When the rotating plate 216 is connected, the release plate 214 is sandwiched between the rotating plate 216 and the adapter plate 212. The bosses 256 on the front side 246 of the release plate 214 are preferably securely received by the receptacles or openings 274 in the rotating plate 216. Alternatively, the front side 246 of the release plate 214 may have receptacles or openings that connect to bosses in the rotating plate 216. In fact, many different types of fastening means are suitable to connect the release plate 214 to the rotating plate 216. The rotating plate should be positioned so that the angled members 278 of the connectors 276 wrap around the second end 238 of the adapter plate 212. The angled members 278 may contact the receptacles or regions 225 (if any) on the front side 218 of the adapter plate 212. The tab(s) 232 on the adapter plate 212 preferably cover the corners of the rotating plate 216 adjacent to the receptacles or openings 274. The tabs 232 help retain the rotating plate 216 in place.

Figure 10A:
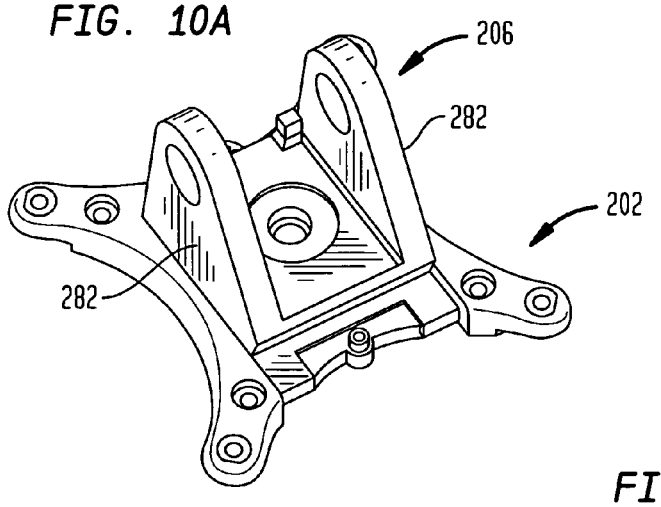
FIGS. 10(a)-(c) illustrate an adapter unit and a tilter mount in accordance with aspects of the present invention.
Figure 10B:
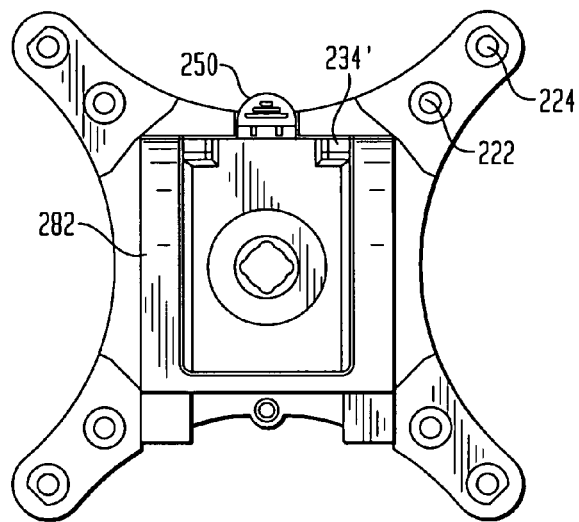
Figure 10C:
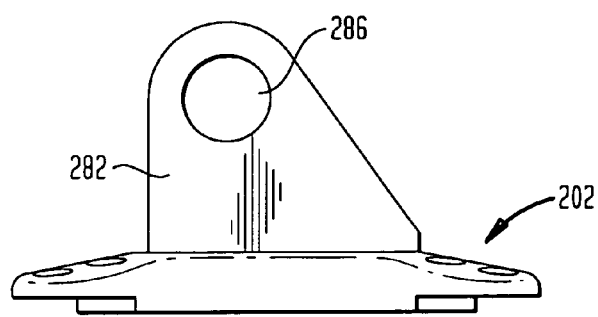

FIGS. 9(c)-(f) illustrate views of the assembled adapter unit 202. FIGS. 10(a)-(c) illustrate the adapter unit 202 releasably connected to the tilter mount 206. Of course, it should be understood that the rotating plate 216 may be riveted to the tilter mount 206 prior to attaching the rotating plate 216 to the release plate 214 and the adapter plate 212. The electronic device 300 may be secured to the adapter plate 212 before or after the whole adapter unit 202 is assembled. The rotating plate 216 permits the release plate 214, the adapter plate 212 and the electronic device 212 to rotate relative to the tilter mount 206.

Once the tilter mount 206 is affixed to the rotating plate 216, the tilter head 204 can be connected to the tilter mount 206 using the tilter bar 208. It should also be understood that the tilter mount 206 may be connected to the tilter head 204 and the tilter bar 208 before or after being riveted or otherwise fastened to the rotating plate 216. After the quick release adapter unit 202 is properly assembled and connected to the tilting device 200 and the electronic device 300, the electronic device preferably becomes adjustable about one or more of the X, Y, and Z-axes as shown in FIG. 2. However, while the rotating plate 216 is described as permitting the electronic device 300 to rotate about the Z-axis, other non-rotating connector plates may be utilized in which the electronic device 300 is not rotatable about the Z-axis. In such cases, the protrusion 270 on the rotating plate 216 is unnecessary, as are the washer channel 292 and the washer 296.

In order to detach the electronic device 300, the user preferably pulls, pushes or otherwise causes the post 250 or other release mechanism to move within the opening 233 of the adapter plate 212 and toward the electronic device 300. This, in turn, causes the main body 245 to deflect or move away from the rotating plate 216. The bosses 256 or other projections of the release plate 214 thus disengage from the holes or recesses 274 of the rotating plate 216. At this point, the rotating plate 216 is at least partly disengaged from the adapter plate 212. If it has not already occurred, the angled members 278 of the connectors 276 are then disengaged from the second end 238 of the adapter plate 212. When the second end 238 of the adapter plate 212 points upward, the rotating plate 216 may be fully removed by sliding it up and off of the adapter plate 212. The electronic device 300 can be placed on a stable surface prior to disengagement in order to avoid potential damage to the electronic device 300.

After detachment of the electronic device 300, the release plate 214 preferably remains coupled to the adapter plate 212. Optionally, the release plate 214 may be detachable from the adapter plate 212. Then the same or a different electronic device 300 may be reattached to an extension arm or other mounting device by securing the rotating plate 216 to the rest of the adapter unit 202 as described above.

Figure 11A:
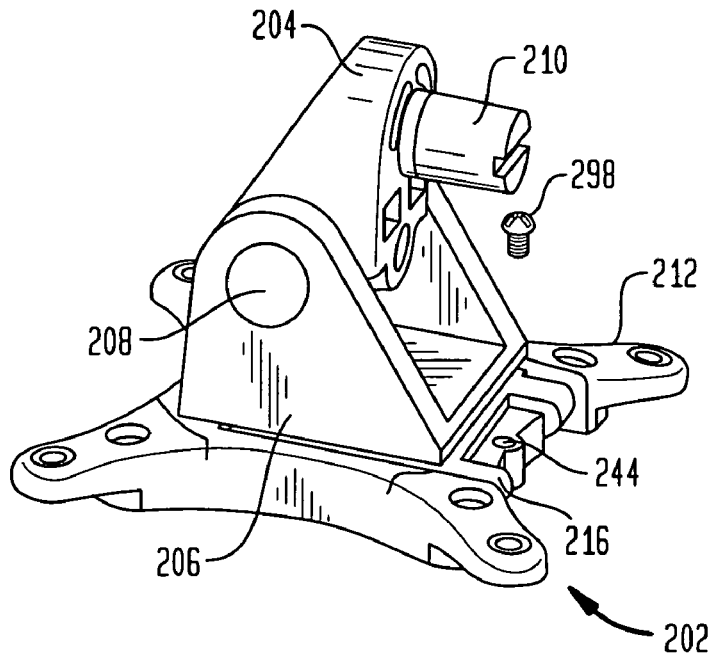
FIGS. 11(a)-(b) illustrate a security mechanism to prevent disassembly of an adapter unit in accordance with aspects of the present invention.
Figure 11B:
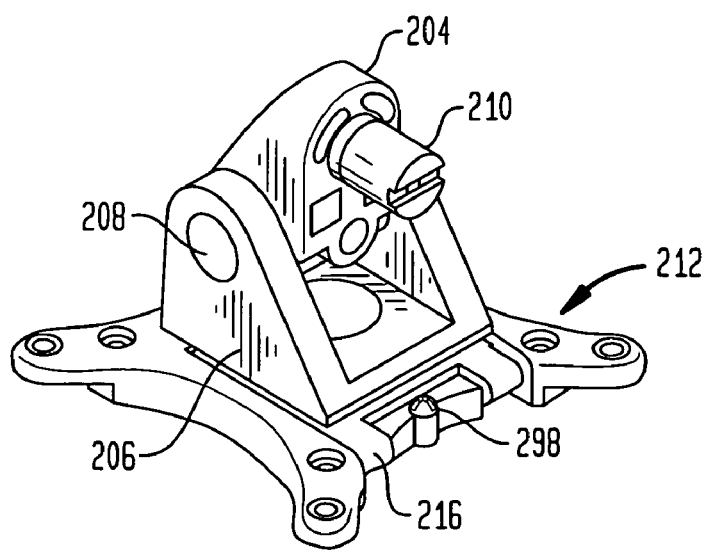

While the release plate 214 permits a user to rapidly disengage the rotating plate 216 from the adapter plate 212, there may be situations when it is desirable to prevent inadvertent or unwanted disengagement. For example, in a high traffic environment, one would like to discourage unauthorized personnel from tampering with the equipment. FIG. 11(a) illustrate a security mechanism in the form of a threaded fastener 298 that is preferably receivable by the through-hole 244 in the adapter plate 212. As seen in FIG. 11(b), when the security mechanism is engaged, e.g., when the threaded fastener 298 is screwed into the through-hole 244, it is not possible to slide the rotating plate 216 away from the adapter plate 212 and the release plate 214. While the security mechanism is illustrated as the threaded fastener 298, many other mechanisms may be used, including, but not limited to clips, clasps, hasps, locks, pins, wing nuts, etc. Thus, it becomes difficult for an unauthorized user to quickly release the adapter plate 212 and the monitor or other electronic device 300 from the rotating plate 216 and the tilter mount 206.

It can be seen that the present invention provides a quick release device which allows a user to easily attach and detach electronic equipment to an extension arm or other mounting device. It is not necessary to remove or loosen hard to reach fasteners in order to disconnect the electronic device. In the brokerage firm example given earlier, a defective monitor may be rapidly swapped for a new monitor, permitting the broker to continue trading without adversely affecting his or her performance. The present invention also provides an alternative security mechanism to prevent unauthorized or accidental detachment of the electronic equipment.

Adapter units in accordance with aspects of the present invention may be used with conventional extension arms and tilting devices. New tilting devices, including the tilter mounts described herein, may also be used with the adapter units to provide partial or full rotation of electronic devices about one or more axes.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An adapter unit for releasably coupling a device to a mounting unit, comprising:
    an adapter plate having means for connecting to the device, the adapter plate including a release mechanism for decoupling a connecting plate from the adapter plate, the connecting plate having means for connecting to the mounting unit and means for coupling to the adapter plate, the connecting plate comprising a rotating plate having a protrusion on a first side thereof, the protrusion being receivable by a channel on a first side of a tilter mount of the mounting unit and being at least partly rotatable along the channel of the tilter mount.

2. The adapter unit of claim 1, wherein the rotating plate is adapted to rotate the device about an axis.

3. The adapter unit of claim 2, wherein the rotating plate is rotatable about the axis through at least 180 degrees.

4. The adapter unit of claim 1, further comprising a washer, the washer being disposed in the channel, the protrusion being in communication with the washer.

5. An adapter unit for releasably coupling a device to a mounting unit, the adapter unit comprising:
    an adapter plate comprising means for fixedly connecting the adapter plate to the device;
    a connecting plate having at least one member that engages the adapter plate when the connecting plate is coupled to the adapter plate, means for connecting the connecting plate to the mounting unit, and a rotating plate, the rotating plate being adapted to rotate the device about an axis; and
    a release mechanism for releasably coupling the connecting plate to the adapter plate, the release mechanism remaining affixed to the adapter plate when the connecting plate is disengaged from the adapter plate.

6. The adapter unit of claim 5, wherein the release mechanism comprises exactly one depression element.

7. The adapter unit of claim 5, wherein the release mechanism comprises a post, the post being receivable in an opening located in the adapter plate.

8. The adapter unit of claim 5, wherein the release mechanism must be moved in a direction substantially towards the device in order to decouple the adapter plate from the connecting plate.

9. An adapter unit for releasably coupling a device to a mounting unit, the adapter unit comprising:
    an adapter plate comprising means for fixedly connecting the adapter plate to the device;
    a connecting plate having at least one member that engages the adapter plate when the connecting plate is coupled to the adapter plate, means for connecting the connecting plate to the mounting unit, and a rotating plate, the rotating plate being adapted to rotate the device about an axis; and
    a release mechanism for releasably coupling the connecting plate to the adapter plate, the release mechanism being configured to enable the connecting plate to be disengaged from the adapter plate when a post is moved toward the device.

10. The adapter unit of claim 9, wherein the release mechanism remains affixed to the adapter plate when the connecting plate is disengaged from the adapter plate.

11. The adapter unit of claim 9, wherein the means for connecting to the device comprises a set of through holes, the set of through holes being adapted to receive a fastener.

12. The adapter unit of claim 11, wherein the set of through holes is located on a first stepped surface located on the front side of the adapter plate, the front side of the adapter plate also including a second stepped surface.

13. The adapter unit of claim 12, wherein the second stepped surface comprises a second set of through holes, the second set of through holes being adapted to receive a fastener.

14. The adapter unit of claim 11, wherein the set of through holes is arranged according to an industry standard for display devices.

15. The adapter unit of claim 9, wherein the adapter plate comprises a first portion and a second portion, the first portion comprising the means for fixedly connecting to the device, the second portion comprising the release mechanism.

16. The adapter unit of claim 15, wherein the first and second portions are fixedly attached together.

17. The adapter unit of claim 15, wherein the first and second portions are releasably attached together by at least one connecting mechanism.

18. The adapter unit of claim 17, wherein the at least one connecting mechanism comprises a protrusion and a receptacle, the receptacle being adapted to receive the protrusion.

19. The adapter unit of claim 17, wherein at least part of the connecting mechanism is located on a planar surface, the planar surface being substantially coplanar with the rear side of the adapter plate.

20. The adapter unit of claim 15, further comprising a cavity located between the first and second portions, the cavity providing sufficient space to allow for deflection of the second portion when the release mechanism is activated, the deflection causing the connecting plate to decouple from the adapter plate.

21. The adapter unit of claim 20, wherein the cavity has a first depth at a first end of the adapter plate, the first end of the adapter plate being located near the release mechanism, and a second depth at an opposite end of the adapter plate, the first depth being greater than the second depth.

22. The adapter unit of claim 9, wherein the rear side of the adapter plate comprises at least one boss and the connecting plate comprises at least one receptacle, the at least one receptacle being adapted to receive the at least one boss.

23. The adapter unit of claim 22, wherein activation of the release mechanism causes the at least one boss to decouple from the at least one receptacle.

24. The adapter unit of claim 9, wherein the release mechanism has exactly one post.

25. The adapter unit of claim 24, wherein the post is receivable in an opening located in the adapter plate when the post is moved toward the device.

26. The adapter unit of claim 9, wherein the at least one member that engages the adapter plate when the connecting plate is coupled to the adapter plate is hooked or angled.

27. The adapter unit of claim 9, further comprising a security mechanism operable to prevent unauthorized or accidental decoupling of the adapter plate from the connecting plate.

28. The adapter unit of claim 27, wherein the security mechanism comprises a threaded fastener receivable by a through hole located in the adapter plate.

* * * * *